(12) United States Patent
Lin

(10) Patent No.: US 8,052,346 B2
(45) Date of Patent: Nov. 8, 2011

(54) TENSIONER NUT

(75) Inventor: Wen-Hwa Lin, Taichung Hsien (TW)

(73) Assignee: VP Components Co., Ltd., Taichung Hsien (TW)

( * ) Notice: Subject to any disclaimer, the term of this patent is extended or adjusted under 35 U.S.C. 154(b) by 335 days.

(21) Appl. No.: 12/381,996

(22) Filed: Mar. 18, 2009

(65) Prior Publication Data

US 2010/0237584 A1 Sep. 23, 2010

(51) Int. Cl.
*B62K 21/04* (2006.01)
(52) U.S. Cl. .................. 403/118; 403/343; 280/280
(58) Field of Classification Search .................. 403/118, 403/343; 74/502.4, 502.6; 280/279, 280; 254/231
See application file for complete search history.

(56) References Cited

U.S. PATENT DOCUMENTS

| | | | | |
|---|---|---|---|---|
| 264,298 A * | 9/1882 | Johnson | ...................... | 24/135 R |
| 1,388,664 A * | 8/1921 | Officer | ......................... | 403/213 |
| 1,502,417 A * | 7/1924 | Arnstein | ..................... | 24/135 R |
| 2,075,239 A * | 3/1937 | Strange | ......................... | 254/231 |
| 5,971,415 A * | 10/1999 | Lin | ............... | 280/280 |
| 7,175,162 B1 * | 2/2007 | Ratcliff | ......................... | 254/231 |
| 2008/0073870 A1 * | 3/2008 | Lane | ........................... | 280/280 |

* cited by examiner

*Primary Examiner* — Michael P Ferguson
(74) *Attorney, Agent, or Firm* — Charles E. Baxley

(57) ABSTRACT

A tensioner nut includes a preload adjusting assembly settled on an upper end of a steering tube of a bicycle, a fixing anchor settled below the steering tube, a cable connecting between the preload adjusting assembly and the fixing anchor, and a bolt of the preload adjusting assembly for tensioning the cable. Thereby, when the bolt is tightened, it tensions the cable and the preload adjusting assembly is pulled downward to give a preload to a stem mounted around the steering tube.

6 Claims, 6 Drawing Sheets

TENSIONER NUT

BACKGROUND OF THE INVENTION

1. Technical Field

The present invention relates to bicycle parts, and more particularly, to a tensioner nut for being assembled atop a stem of a bicycle so as to pull the stem downward to preload a set of head parts of the bicycle.

2. Description of Related Art

Various assembling parts for assembling a stem, a set of head parts, a head tube and a steering tube of a bicycle have been developed to date. One instance is U.S. Pat. No. 7,204, 502, titled "Steering Bearing Assembly for Vehicle". In the following description related to this prior patent, all recited elements are referred to the numerals indicating the corresponding elements shown in the drawing sheet of the published Patent as can be obtained from the USPTO Web Patent Databases. This prior patent disclosed a head tube 30 accommodating a steering tube 23 and having a top bearing 40 and a bottom bearing 45 assembled to the top and bottom ends thereof. A handlebar stem tube 62 of a handlebar assembly is mounted atop the steering tube and preloads the top bearing 40 at the top end the head tube 30. A bolt 65 is installed in the top of the steering tube 23 to exert a downward force to the handlebar stem tube 62 so that the handlebar stem tube 62 presses downward and thus position the top bearing 40. Finally the handlebar stem tube 62 is tightened onto the steering tube 23 of the bicycle so that the stem, the head parts, the head tube and the steering tube are well assembled.

Referring to FIG. 1 provided in the present application, the bolt 65 recited in the aforementioned prior patent is composed of a start nut 651, a screw 652 and a top cap 653. The screw 652 centrally passing through the top cap 653 and getting engaged with a threaded hole 654 of the start nut 651. The star nut has two discs of hardened steel each with a plurality of sharp tabs 655. The start nut 651 is placed into the steering tube so that the sharp tabs 655 engage on the internal bore of the steering tube. Due to the configuration of the discs, the start nut 651 is allowed to move inward the steering tube and retained from leaving the steering tube. The top cap 653 presses on the top of the stem so that when the bolt 652 is tightened, the top cap 653 is pushed downward and in turn preloads the top bearing 40.

In the past when steering tubes were made from steel the star nut 651 was acceptable. Now steering tubes are made from aluminum alloy or even from carbon composite materials and so the damage that a star nut can cause when it is hammered in position is unacceptable and potentially dangerous. Besides, once the star nut 651 is assembled it cannot be removed without causing further damage and destructive deformation. Thus, the traditional device is unfavorable to stem replacement or head-parts preload adjustment.

SUMMARY OF THE INVENTION

Hence, one objective of the present invention is to provide a tensioner nut for assembling a stem, a set of head parts, a head tube, and a steering tube of a bicycle. The disclosed tensioner nut exerts an axial load to the stem by a non-destructive means so as to assemble and position the previously recited components.

One objective of the present invention is to provide a tensioner nut that eliminates uneven hoop stress or concentrated point load acting on an internal bore of a steering tube, thereby ensuring the integrity of the steering tube.

Another objective of the present invention is to provide a tensioner nut that is adaptive to steering tubes of any shape.

Another objective of the present invention is to provide a tensioner nut that can easily be removed and reassembled without damage and whose assembly and disassembly require only standard hand tools.

The tensioner nut of the present invention comprises a preload adjusting assembly, a fixing anchor, and a cable connecting between the preload adjusting assembly and the fixing anchor. The preload adjusting assembly has a bolt for tensioning the cable. To assemble a stem, a set of head parts, a head tube, and a steering tube of a bicycle with the disclosed tensioner nut, the preload adjusting assembly is placed into an upper end of the steering tube while pressing an upper end of the stem that is mounted around the steering tube, and the fixing anchor is settled at a lower end of the steering tube. The cable has a free lower end passing through a hole preformed at the lower end of the steering tube to get coupled with the fixing anchor. When the bolt is screwed to tension the cable, the preload adjusting assembly is pulled downward to give a preload to the stem so as to make the stem press the head parts located therebelow. Finally the assembly of the stem, the head parts, the head tube, and the steering tube is accomplished by tightening the stem onto the steering tube.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE PREFERRED EMBODIMENT

While a preferred embodiment is provided hereinafter for illustrating the concept of the present invention as described above, it is to be understood that the components of the embodiment shown in the accompanying drawings are depicted for the sake of easy explanation and need not to be made in scale.

Figure 1:
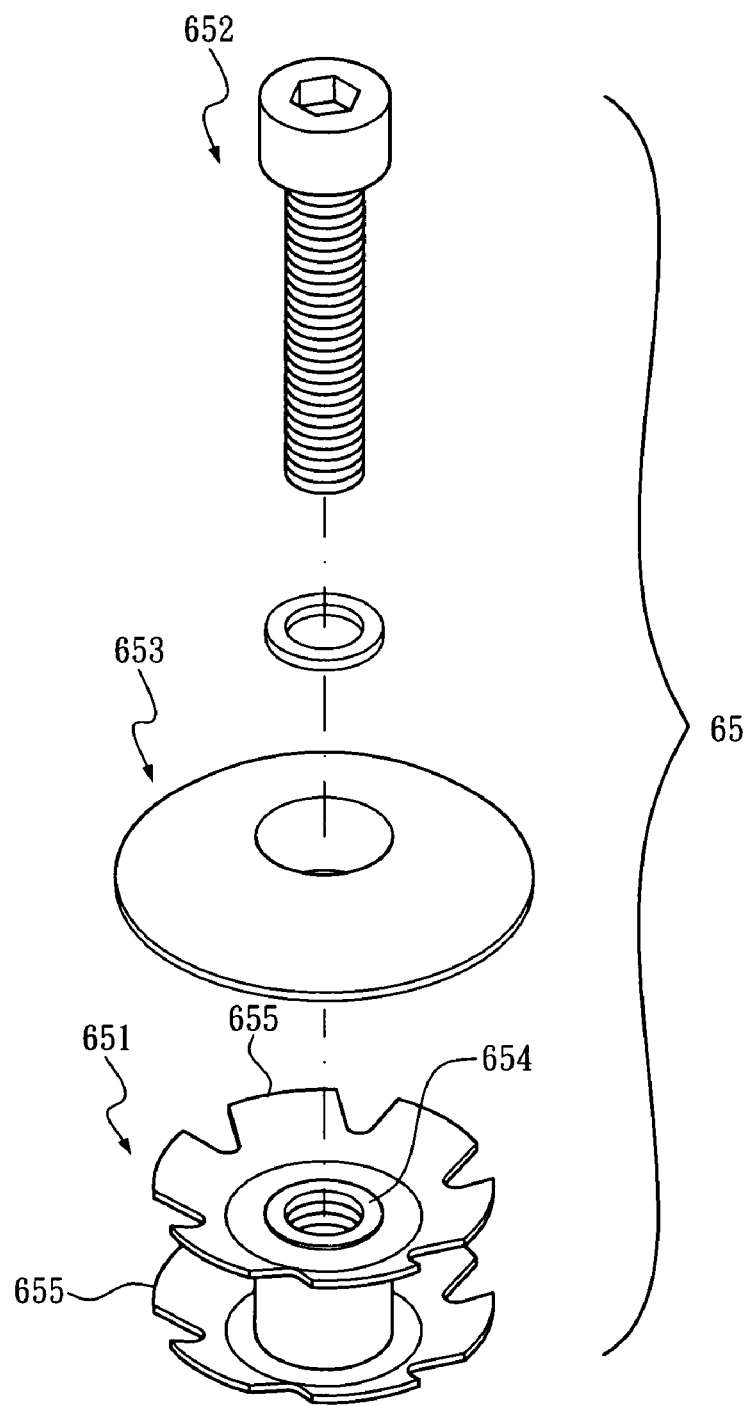
FIG. 1 is an exploded view of a bolt with a star nut according to a prior art.
Figure 2:
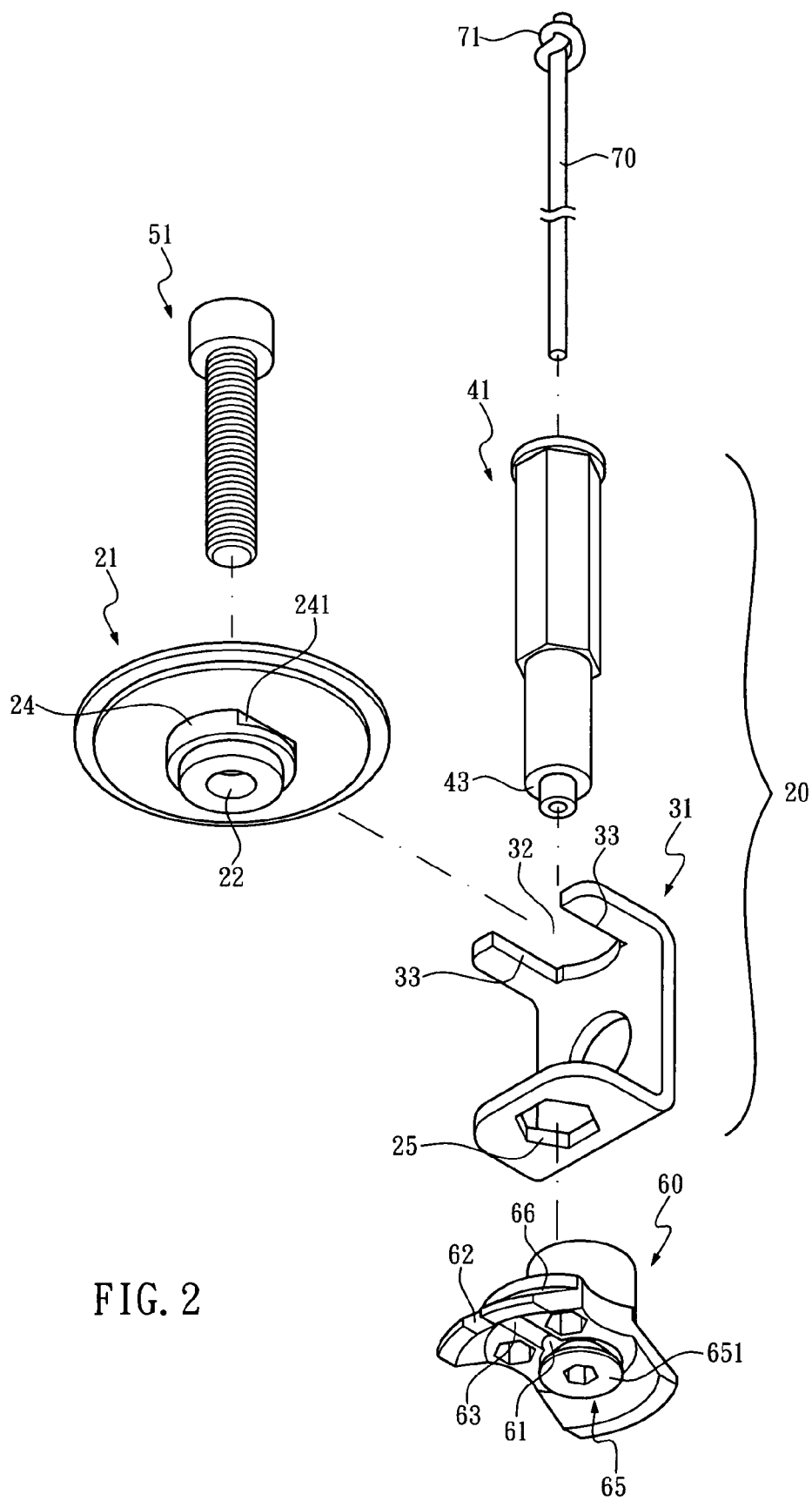
FIG. 2 is an exploded view of a tensioner nut of the present invention.
Figure 3:
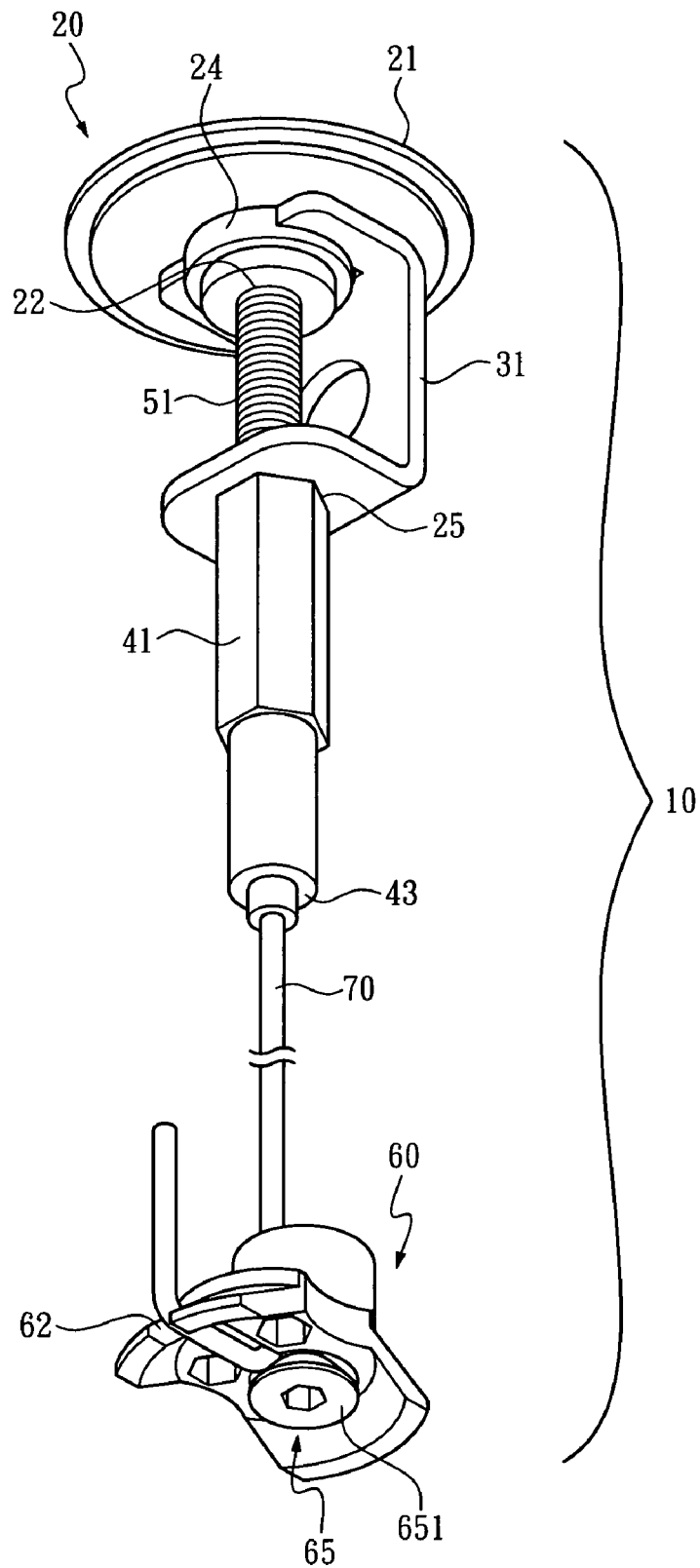
FIG. 3 is a perspective view of the tensioner nut of the present invention.
Figure 4:
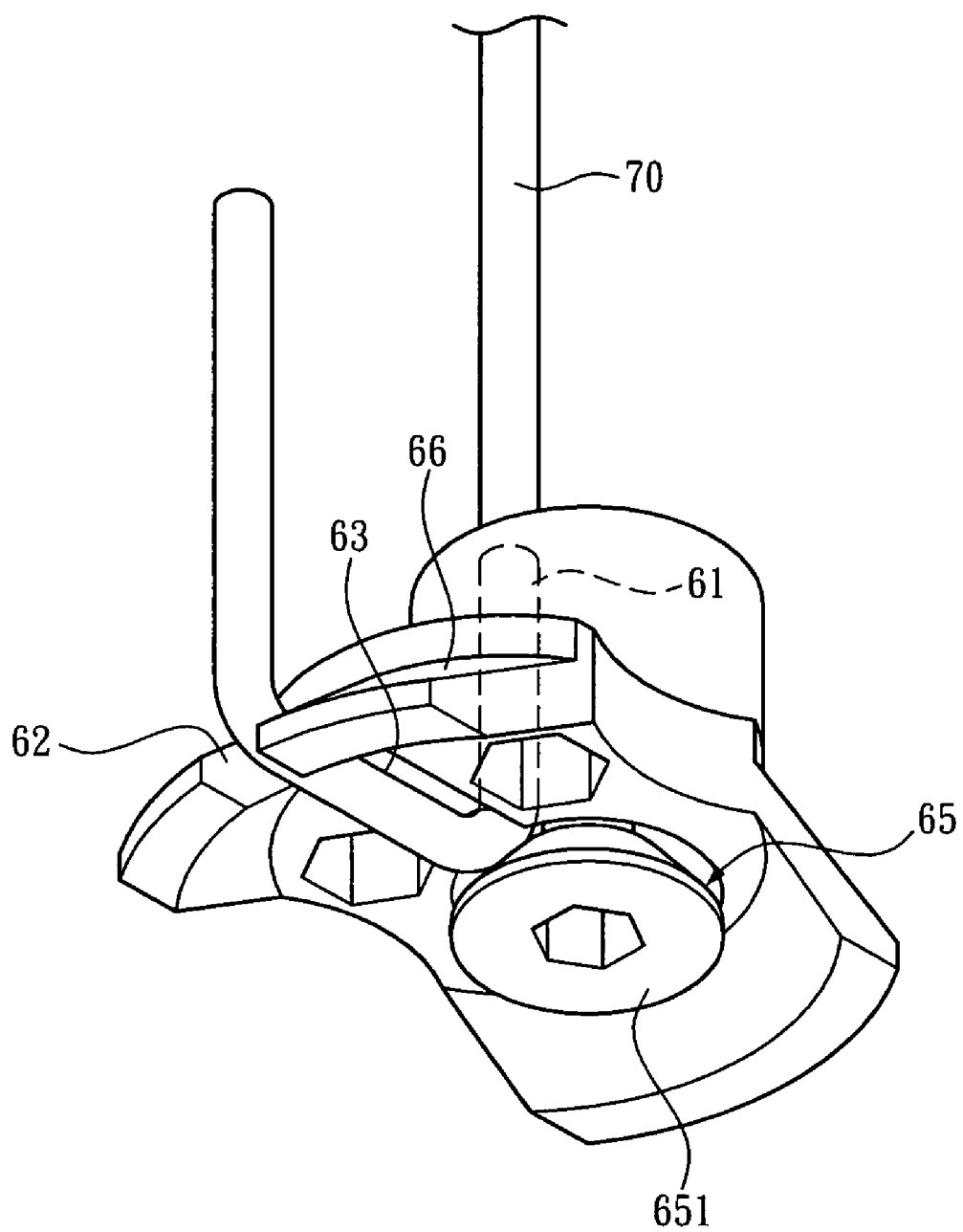
FIG. 4 is a perspective view of a fixing anchor of the tensioner nut.

Referring to FIG. 2 through FIG. 4, a tensioner nut 10 of the present invention comprises a preload adjusting assembly 20, a fixing anchor 60, and a cable 70 connecting the preload adjusting assembly 20 and the fixing anchor 60.

Figure 5:
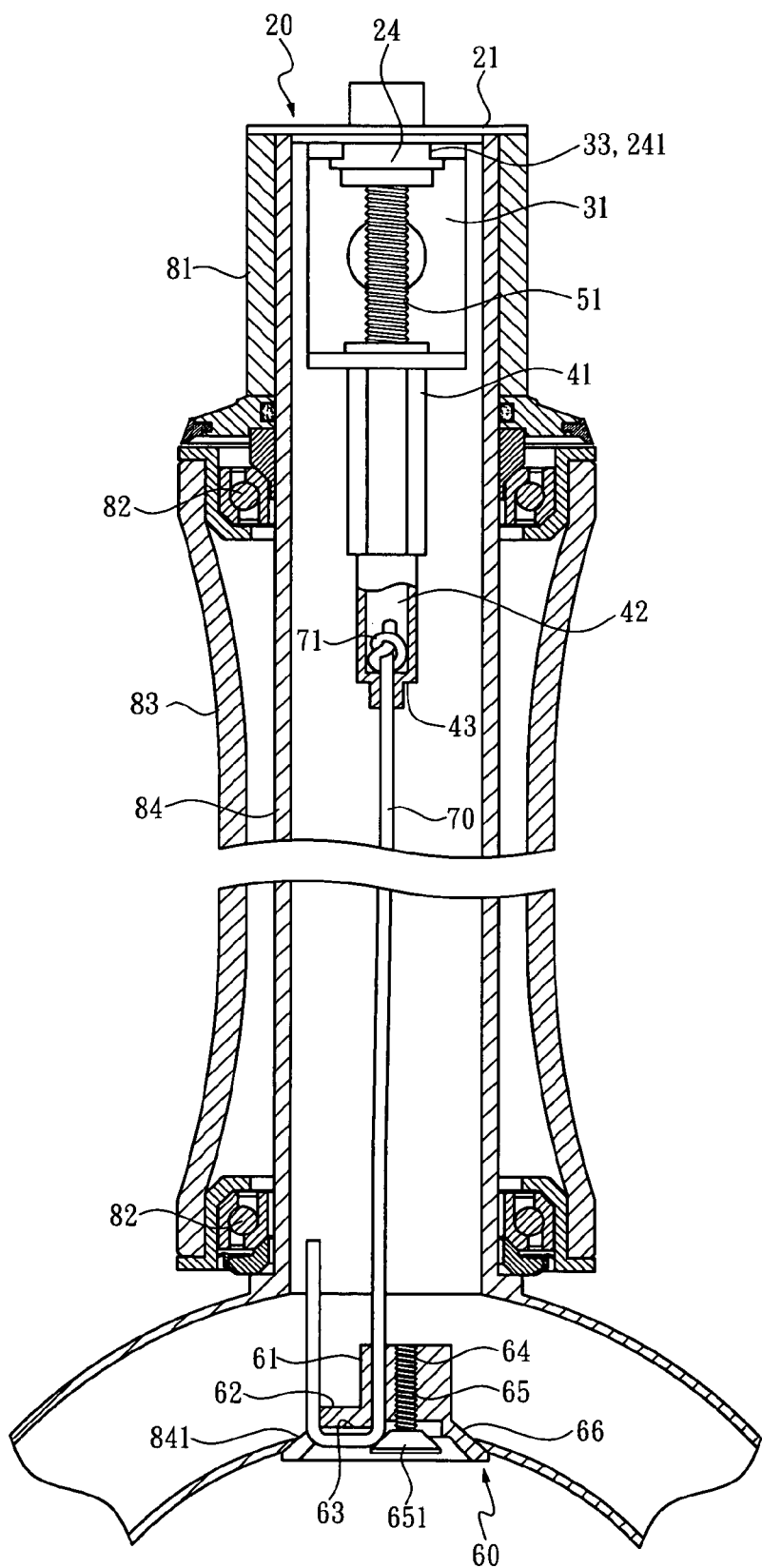
FIG. 5 is an applied drawing showing the tensioner nut of the present invention used to assemble a stem, a set of head parts, a head tube and a steering tube of a bicycle.

The preload adjusting assembly 20 includes a top cap 21, a guide 31, a slider 41 and a bolt 51. The top cap 21 has a central hole 22 for allowing the bolt 51 to pass therethrough and a combining portion 24 at a bottom thereof. The guide 31 has an opening 32 at a top thereof for coupling with the combining portion 24. Flats 241 are formed at laterals of the combining portion 24 for contacting edges 33 of the opening 32 so as to prevent not only rotation but also axial displacement of the guide 31 relative to the top cap 21. In the lower portion of the guide 31 there is a hole 25 for the slider 41 to pass therethrough. The hole 25 and the slider 41 have sectional shapes that prevent the slider 41 from rotating relative to the guide 31. In this embodiment, the hole 25 and the slider 41 are hexagonal in shape so as to prevent relative rotation but allow relative axial displacement between the slider 41 and the guide 31. The slider 41 contains a concentric axial hole 42, as shown in FIG. 5. The axial hole 42 has inner threads at an upper portion of for engaging with the bolt 51. A stepped portion 43 of the slider 41 provides the axial hole 42 with a stepped diameter so that when the cable 70 passes through the axial hole 42, a knot structure 71 formed at an upper end of the cable 70 is retained by the stepped portion 43, thereby preventing the cable 70 from moving down any further within the slider 41.

The cable 70 is tough yet light. For example, the cable 70 may be a steel strip, or the cable 70 may be a brake cable or a gear wire for bicycles.

The fixing anchor 60 is provided with an entry hole 61 and an exit hole 62. Besides, a guiding groove 63 is provided at a bottom of the fixing anchor 60 for connecting the entry hole 61 and the exit hole 62. The cable 70 has a free lower end tucked into the entry hole 61, passing along the guiding groove 63 and finally exposed at the exit hole 62. A threaded hole 64 (as shown in FIG. 5) is formed on the fixing anchor 60 near the entry hole 61 for a screw 65 to be screwed upward thereinto. When the screw is tightened, a head 651 thereof clamps the cable 70 to the fixing anchor 60. The fixing anchor 60 further has a tapered flange 66.

Figure 6:
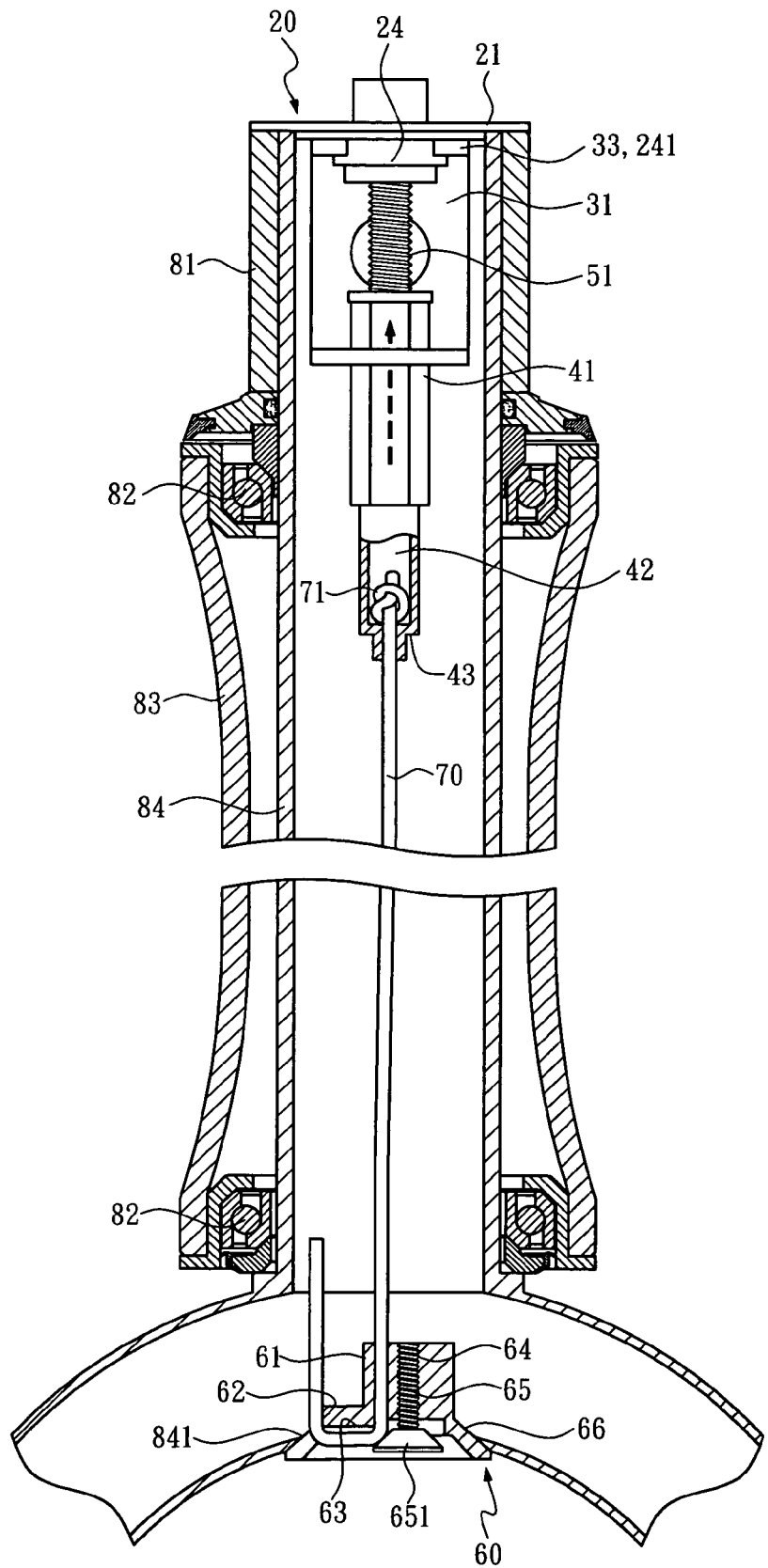
FIG. 6 shows the tensioner nut being tightened and giving a preload to the stem.

The assembly procedure of the tensioner nut 10 is explained in FIGS. 5 and 6. Therein, a stem 81, a set of head parts 82, a head tube 83 and a steering tube 84 of a bicycle are assembled in a conventional way. The bolt 51 of the preload adjusting assembly 20 is loosened so that the slider 41 is fully down to the lower portion of the guide 31. Then the preload adjusting assembly 20 is placed into an upper end of the steering tube 84 with the top cap 21 pressing an upper end of the stem 81 so that the guide 31, the slider 41, the bolt 51 and the cable 70 are received inside the steering tube 84. The tapered flange 66 of the fixing anchor 60 locates in a hole 841 preformed at the lower end of the steering tube 84. Since a maximum diameter of the tapered flange 66 is greater than that of the hole 841, the fixing anchor 60 is positioned at the lower end of the steering tube 84. Then the cable 70 is strung and then the free lower end thereof is drawn to pass through the entry hole 61, the guiding groove 63, and the exit hole 62 and then turn back into to the steering tube 84. Afterward, the screw 65 is tightened sop as to clamp the cable 70 between the head 651 and the fixing anchor 60. Then the bolt 51 is rotated clockwise when viewed from above with a screwdriver so as to draw up the slider 41 and in turn tension the cable 70. Consequently, the top cap 21 is pulled downward and thus gives a preload to the stem 81, thereby making the stem 81 press and position the head parts 82 located below the stem 81. Finally the stem 81 is tightened onto the steering tube 84 and the assembly is accomplished.

The present invention has the following advantages.

The top cap 21 provides an axial load to the stem 81 by a non-destructive means and facilitates assembling the stem 81, the head parts 82, the head tube 83 and the steering tube 84.

The tensioner nut brings no hoop stress to the internal bore of the steering tube 84, thereby not causing damage to the internal bore.

The tensioner nut is adaptive to steering tubes of any shape.

The tensioner nut can easily be removed and reassembled without damage. Besides, assembly and disassembly of the tensioner nut require only standard hand tools.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A tensioner nut comprising:
   a preload adjusting assembly;
   a fixing anchor; and
   a cable connecting between the preload adjusting assembly and the fixing anchor;
   the preload adjusting assembly comprising:
   a top cap having an unthreaded central hole;
   a guide;
   a slider having a concentric axial hole; and
   a bolt for tensioning the cable;
   the guide being fixed to a bottom of the top cap and having a guide hole for the slider to pass therethrough, the guide hole and the slider having cross- sectional shapes that prevent the slider from rotating relative to the guide, the guide hole and the central hole being axially aligned;
   the bolt passing through the central hole of the top cap and being threadably engaged with a threaded upper end of the axial hole of the slider, and
   the slider being connected with an upper end of the cable, wherein a stepped portion is formed within a lower end of the axial hole and provides a stepped diameter with the cable received in the axial hole so that when the cable passes through the axial hole, a knot structure formed at an upper end of the cable is retained by the stepped portion;
   the fixing anchor being provided with an entry hole and an exit hole in which a free lower end of the cable passes therethrough and fixedly retained;
   wherein the bolt is rotated within the top cap such that the slider moves upwardly within the guide hole along the bolt in a direction away from the fixing anchor in order to apply tension to the cable.

2. The tensioner nut of claim 1 wherein a combining portion is formed at the bottom of the top cap for engaging with an upper portion of the guide, and flats are formed at laterals of the combining portion for contacting the guide.

3. The tensioner nut of claim 1, wherein the cross-sectional shapes that prevent the slider form rotating relative to the guide hole are hexagonal.

4. The tensioner nut of claim 1, wherein a guiding groove is provided at a bottom of the fixing anchor for connecting the entry hole and the exit hole.

5. The tensioner nut of claim 4, wherein a threaded hole is formed on the fixing anchor near the entry hole for a screw to be screwed upward thereinto so that when the screw is tightened, a head of the screw clamps the cable to the fixing anchor.

6. The tensioner nut of claim 1, wherein the fixing anchor has a tapered flange.

* * * * *